W. SAY.
VEHICLE BRAKE.
APPLICATION FILED DEC. 26, 1913.
1,108,794. Patented Aug. 25, 1914.
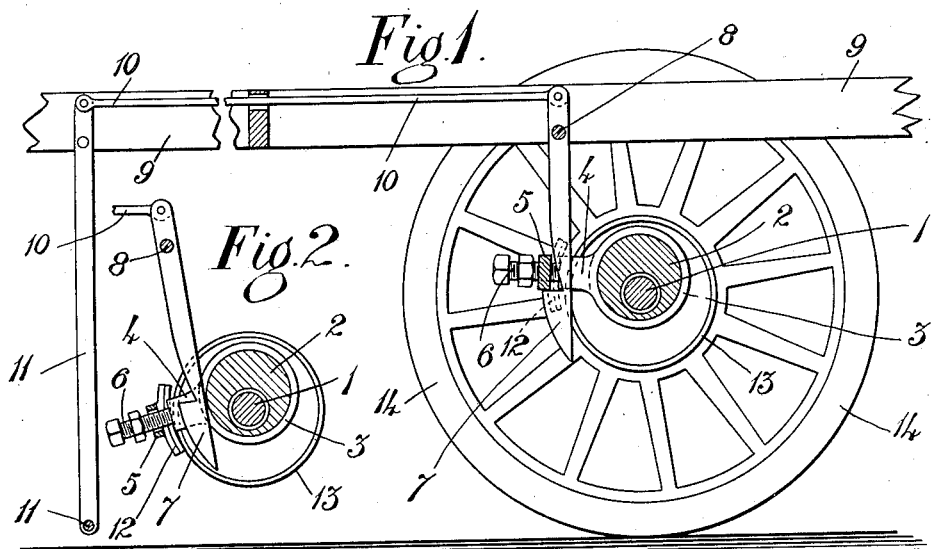
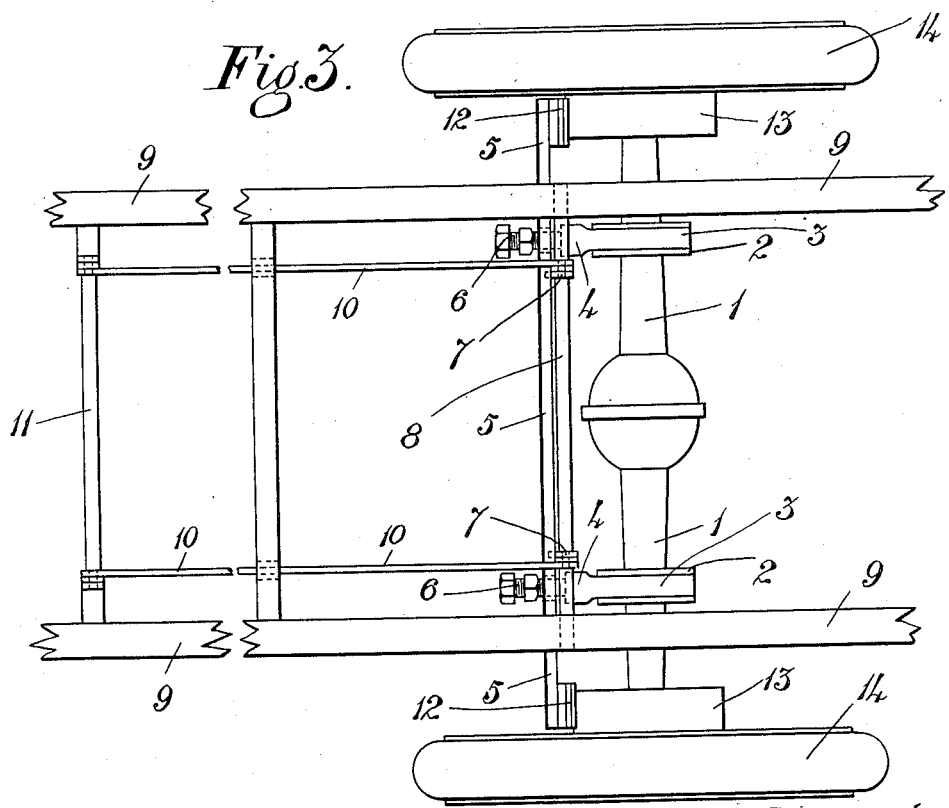

UNITED STATES PATENT OFFICE.

WILLIAM SAY, OF LONDON, ENGLAND.

VEHICLE-BRAKE.

1,108,794.  Specification of Letters Patent. Patented Aug. 25, 1914.

Application filed December 26, 1913. Serial No. 808,887.

*To all whom it may concern:*

Be it known that I, WILLIAM SAY, a subject of the King of Great Britain, residing at London, England, have invented certain new and useful Improvements in Vehicle-Brakes, of which the following is a specification.

The object of my invention is to construct in an improved manner an efficient automatic brake for self propelled and other vehicles, so that on an obstacle striking an appliance connected with the brake, such brake will be released and automatically act upon the vehicle, the braking being assisted by the onward movement of the wheel or wheels.

My invention will be clearly understood from the following description aided by the annexed drawings in which:—

Figure 1 is a side elevation of a portion of the chassis and one of the driving wheels of a motor vehicle and showing the brake and its operating appliances, the brake being "off." Fig. 2 is a part sectional side elevation of the brake drum, the eccentric, and the brake and its releasing member, the brake being "on." Fig. 3 is a plan of a portion of Fig. 1.

According to the invention, there is connected to the fixed axle 1, or casement or bearing or other fixed part of a motor vehicle, a pair of disks 2, eccentric to the axial line of the wheel or wheels to be braked, and around each of these disks is positioned a ring 3 having an arm 4 projecting at an angle thereto. To said arms a rod 5 is connected by screws 6, whereby its position may be adjusted relative to a hook or hooks 7, to permit proper engagement of the latter with said rod, as hereafter described. The hooks 7 are connected to a shaft 8 journaled in the chassis 9, and such shaft 8 is connected by rods 10, 10, to an emergency rod or frame 11, which is also pivoted to the chassis 9 below the rods 10 and which nearly touches the ground.

The brake blocks 12, 12, are at the ends of the rod 5 and are in proximity to drums 13, 13, on the wheels 14, 14. or, it may be, to the rims or tires of the wheels themselves.

The frame 11 may be in the form of a plain or curved grid, so as to catch up any obstacle, (say a person), which strikes same. In ordinary use, the frame 11 and the hooks 7 hang with the hooks 7 engaging the rod 5 and holding the brake blocks 12 clear of the drums 13, so that the wheels 14 run free, but should the frame 11 be struck by any obstacle, it will rock about its pivots and pulling forwardly the rods 10, will release said hooks from engagement with said rod, whereupon the latter will drop by its own weight, carrying with it the rings 3, which are thus caused to move around the disks 2 drawing the brake blocks toward and into frictional engagement with the drums 13, the disks 2 acting upon said rings to draw the brake blocks still closer to the said drums and thus efficiently brake the wheels.

The brake can be easily released by backing the vehicle or lifting the arms 4, in order to enable the rod 5 to reëngage the hooks 7.

If required I may provide the top of the frame 11 above its pivotal connection with a rod or lever extending upward to near the driver so that the hooks 7 can be released by hand.

What I do claim as my invention and desire to secure by Letters Patent is:—

1. A vehicle brake comprising an eccentric adapted for attachment to the axle of the vehicle; a ring encircling said eccentric and provided with a radial arm; a cross-rod connected to said arm and provided with a pair of brake blocks; a pivotally-mounted, depending hook releasably engaged with said rod, for normally holding the latter elevated and its brake blocks in inoperative position; and means for rocking said hook to release the same.

2. A vehicle brake comprising an eccentric adapted for attachment to the axle of the vehicle; a ring encircling said eccentric and provided with a radial arm; a cross-rod connected to said arm and provided with a pair of brake blocks; a shaft mounted in the chassis of said vehicle; a pair of vertical members connected intermediate their ends to said shaft and having hooked lower ends releasably engaged with said rod, for normally holding the latter elevated and its brake blocks in inoperative position; a pair of forwardly-extending rods pivotally connected at their rear ends to the upper ends of said hooked members; and a rocking frame pivoted to said chassis and connected to the front ends of the last-named rods, for releasing the said hooked members from such engagement.

3. A vehicle brake comprising an eccentric adapted for attachment to the axle of the vehicle; a ring encircling said eccentric and provided with a radial arm; a cross-rod connected to said arm and provided with a pair of brake blocks; a member releasably engaged with said rod for normally holding the latter elevated, and its brake blocks in inoperative position; and means for tripping said member, to release the same from such engagement.

In testimony whereof I have hereunto set my hand in presence of two subscribing witnesses.

WILLIAM SAY.

Witnesses:
WM. O. BROWN,
FREDK. HUTCHINS.